May 21, 1963 E. J. TAUCH 3,090,679
PROCESS FOR PREPARING AQUEOUS SILICATE SOLUTIONS
Filed July 21, 1961
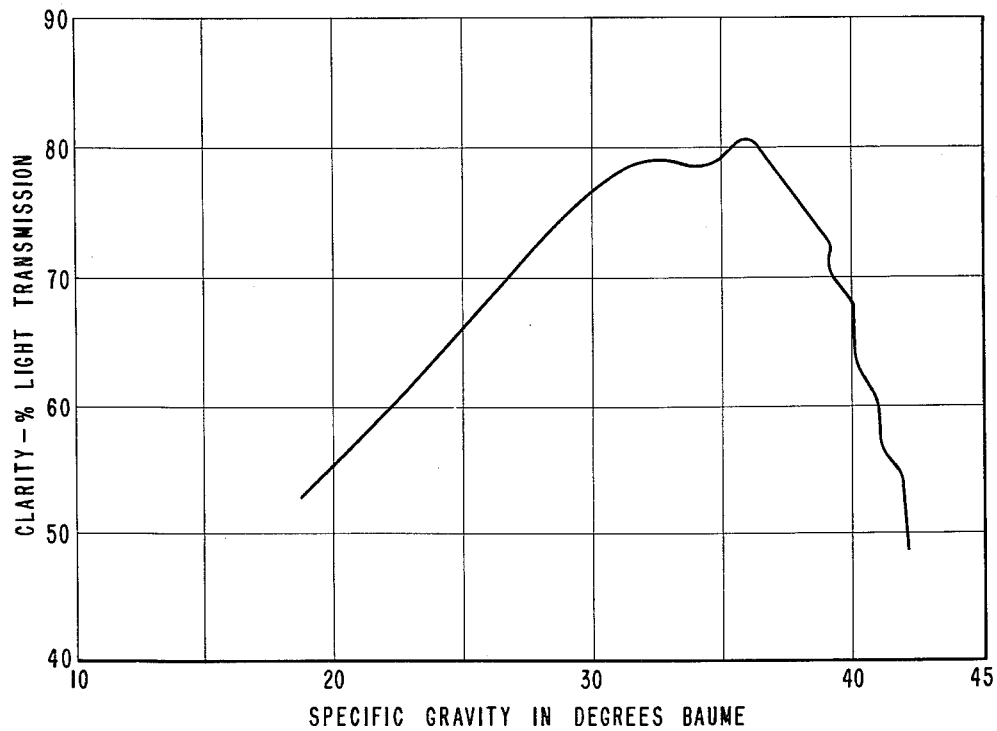
*INVENTOR*
ERNEST J. TAUCH
BY Frederick F. Butzi
*ATTORNEY*

United States Patent Office 3,090,679
Patented May 21, 1963

3,090,679
PROCESS FOR PREPARING AQUEOUS
SILICATE SOLUTIONS
Ernest J. Tauch, Cleveland, Ohio, assignor to E. I. du Pont de Nemours and Company, Wilmington, Del., a corporation of Delaware
Filed July 21, 1961, Ser. No. 125,762
2 Claims. (Cl. 23—312)

This invention relates to a process for the preparation of concentrated sodium silicate solutions. It is more particularly directed to a process which will yield concentrated aqueous sodium silicate solutions having superior clarity.

In the drawing, the graph illustrates the relationship between clarity and specific gravity in aqueous sodium silicate concentrates prepared according to the pressure-dissolving method.

Heretofore, aqueous sodium silicate solutions have been brought to commercial concentrations of 40–43° Bé. by dissolving sodium silicate glass in water under steam pressure of from 20–100 lbs. per square inch. This method dissolves the glass quite rapidly, but unfortunately solutions prepared in this fashion are quite turbid and rarely have clarities in excess of 30–50% light transmission, as compared with distilled water.

Since many applications require sodium silicate concentrates to have clarities better than this, many processers have resorted to filtration and centrifugation to remove the suspended solids which cause the turbidity. This naturally is bothersome and quite expensive.

The process of this invention alleviates all these shortcomings and yields a concentrated sodium silicate solution which meets all the requirements of industry so far as clarity of product is concerned.

It has been observed, in the pressure-dissolving process commonly used, that the clarity of the sodium silicate solution, expressed in terms of percent light transmission, rises gradually as the specific gravity of the solution is increased. At 36° Bé., however, as the concentration of the solution is increased, the clarity suddenly decreases sharply and drastically. As the specific gravity of the solution is increased from 32–36° Bé. to the commercial concentration of 40–43° Bé., the clarity drops from approximately 80% light transmission to below 50% light transmission. This unusual and unexpected phenomenon is illustrated in the graph of the drawing.

The reason for this is not precisely known, but it is believed that the impurities which cause turbidity are sensitive to heat much as silver salts are sensitive to light, and as the concentration of the solution and the amount of heat required are raised, the silicate solution becomes increasingly turbid.

In view of this unexpected drop in clarity, the concentrated sodium silicate solutions are prepared according to this invention by first pressure-dissolving sodium silicate glass in water to a concentration of approximately 32–38° Bé. The dissolving is then stopped and concentration to a commercial density of 40–43° Bé. is achieved by removing water under vacuum. The application of heat and pressure in the most sensitive turbidity range is thereby avoided and the solution is brought to commercial concentration with minimum heat.

The starting material used in the process of this invention can be any well-fused sodium silicate glass. Such glasses are ordinarily formed by melting sand with soda ash at about 1100° C. The $SiO_2$:$Na_2O$ weight ratios of such glasses are ordinarily in the range of from 3.10:1 to 3.3:1 and are preferably about 3.25:1.

Since the amount of impurities in the sodium silicate starting material will affect final clarity, it is preferred that the starting silicate glass contain not more than about .1% to .7% by weight of insoluble impurities.

These starting silicate glasses are first fractured into lumps of approximately 1 to 3 inches in diameter, and are then dissolved in water under steam pressures of from 20 to 100 lbs. per square inch. This can be done in an autoclave, either stationary or rotary. The pressure-dissolving is continued until the sodium silicate solutions has a specific gravity of from 32–38° Bé., preferably 35–38° Bé., and is then stopped.

At this point, the sodium silicate solution can be placed into a tank, where the heavier suspended solids settle out. This step, however, is optional and the entire process can be run just as well if the settling step is omitted. The temperatures at which the settling is carried out and the time required for adequate settling are largely a matter of choice, and will be apparent to those skilled in the art.

The sodium silicate solution is pumped into a vacuum evaporator either from the settling chamber or directly from the autoclave. Any conventional vacuum evaporation apparatus can be used so long as process conditions can be maintained within operational ranges.

The conditions under which the vacuum evaporation step are carried out are not critical. Generally, the evaporation is made at a pressure of from about 1–12 lbs. per square inch absolute, preferably 2–4 lbs. per square inch absolute, and at temperatures of from about 100–200° F., preferably 125–150° F. The amount of time required for the concentrates to reach the desired specific gravity will naturally depend upon the degree of heat and amount of pressure applied. Generally, however, the step should not require more than 1 or 2 hours.

Sodium silicate concentrates prepared according to this process have light transmissions of at least about 55%. Solutions having clarities as high as 75% are common and frequently it is possible to prepare batches of sodium silicate solutions which have clarities as high as 90–95%.

These light transmissions are measured with a Fisher electrophotometer, using a 425B filter, using distilled water as the 100% light transmission reference. The light source is an ordinary incandescent bulb in a null-balance electronic circuit.

The following examples are presented in order that this invention be more easily understood and more readily practiced.

Example 1

A pressure-type dissolver is charged with water and sodium silicate glass having an $SiO_2$:$Na_2O$ ratio of 3.25:1. The glass lumps are fractured into pieces having diameters of 1 inch or less. The dissolver is then rotated under a steam pressure of 60 lbs. per square inch gauge for 50 minutes. The solution is discharged rapidly into a tank at atmospheric pressure. At this point, the sodium silicate solution has a specific gravity of 38° Bé. and a clarity of 78% light transmission.

The solution is held for about 150 minutes in a settling tank and is then passed to a continuous evaporative concentrater where the solution is concentrated at a temperature of 135° F. and a pressure of 2 p.s.i.a. to a specific gravity of about 41° Bé. This solution has a clarity of 75% light transmission.

Example 2

Sodium silicate glass having an $SiO_2$:$Na_2O$ weight ratio of 3.25:1 is dissolved in a plant dissolver at 60 lbs. per square inch of steam pressure for 50 minutes to produce a sodium silicate solution having a specific gravity of 37.5° Bé.

The solution is withdrawn and placed in a Pyrex flask equipped with a thermometer and vacuum connection. A pressure of 1 lb. per square inch absolute and a temperature of 100° F. is maintained for about 20 minutes to produce a sodium silicate solution having a specific gravity of 42.6° Bé.

This solution has a clarity of 67% light transmission as compared with a sample of sodium silicate having an equivalent specific gravity, concentrated according to the pressure-dissolving method, which solution has a light transmission of only about 40%.

This application is a continuation-in-part of application Serial No. 783,691, filed December 30, 1958, and now abandoned.

The embodiments of the invention in which an exclusive property or privilege is claimed are:

1. A process for the preparation of aqueous sodium silicate solutions from solid sodium silicate glass, said process comprising
   (a) dissolving enough of said silicate glass in water under steam pressure of from about 20 to about 100 lbs. per square inch to form a solution having a specific gravity of from 32° to 38° Bé.; and then
   (b) evaporating water from said solution under reduced pressure until said solution has a specific gravity of at least 41° Bé.

2. In a process for the preparation of aqueous sodium silicate solutions having specific gravities of from 41–43° Bé., said process consisting essentially of dissolving enough of a solid sodium silicate glass in water under a steam pressure of from about 20–100 lbs. per square inch, the improvement comprising stopping said pressure-dissolving when the specific gravity of said solution reaches about 32–38° Bé. and thereafter concentrating said solution to a specific gravity of 41–43° Bé. by evaporating water from said solution under reduced pressure.

References Cited in the file of this patent

UNITED STATES PATENTS

| | | |
|---|---|---|
| 1,111,918 | Paterson | Sept. 29, 1914 |
| 2,251,515 | Curll | Aug. 5, 1941 |

OTHER REFERENCES

Vail: Soluble Silicates, vol. 1, page 71, A.C.S. Monograph Series No. 116, Reinhold Publ. Co., 1952.